United States Patent [19]

Chivrall

[11] Patent Number: 4,473,478
[45] Date of Patent: Sep. 25, 1984

[54] CYCLONE SEPARATORS

[75] Inventor: Graham B. Chivrall, Lancashire, England

[73] Assignee: Beloit Corporation, Beloit, Wis.

[21] Appl. No.: 496,355

[22] Filed: May 19, 1983

[30] Foreign Application Priority Data

May 25, 1982 [GB] United Kingdom ............... 8215401

[51] Int. Cl.$^3$ .................................................. B04C 5/26
[52] U.S. Cl. ...................................... 210/788; 55/206; 209/211; 210/512.2
[58] Field of Search ................................ 209/144, 211; 210/512.1, 512.2, 787, 788, 512.3; 55/202, 206

[56] References Cited

U.S. PATENT DOCUMENTS

| | | | |
|---|---|---|---|
| 3,052,361 | 9/1962 | Whatley et al. | 210/512.2 |
| 3,306,444 | 2/1967 | Troland | 209/211 |
| 3,971,718 | 7/1976 | Reid | 209/144 X |
| 4,148,722 | 4/1979 | Surakka et al. | 210/512.2 X |
| 4,212,653 | 7/1980 | Giles | 209/144 X |
| 4,265,740 | 5/1981 | Luthi | 210/512.1 X |

Primary Examiner—Richard V. Fisher
Assistant Examiner—W. Gary Jones
Attorney, Agent, or Firm—Dirk J. Veneman; Raymond W. Campbell; Gerald A. Mathews

[57] ABSTRACT

A method and apparatus for separating a fluid containing particulate matter into a plurality of fractions.

In order to carry out the separation of both heavy and light contaminants from the fluid in an efficient manner, there is provided apparatus comprising a reverse vortex cyclone separator and a Uniflow cyclone (uni-direction cyclone) separator. Heavy contamination is removed from fluid admitted to the reverse vortex cyclone separator at an end remote from the fluid inlet and fluid substantially cleaned of heavy contaminants passes from the reverse vortex cyclone separator to the Uniflow cyclone separator by way of an axial passage and/or circumferential passages disposed at the inlet end of the reverse vortex separator. Respective outlets for the accepts and rejects are provided in the Uniflow separator at a location remote from the inlet.

The respective chambers of the reverse and Uniflow separators are preferably conical and coaxial with one another with the Uniflow separator disposed vertically above the reverse vortex separator.

16 Claims, 3 Drawing Figures

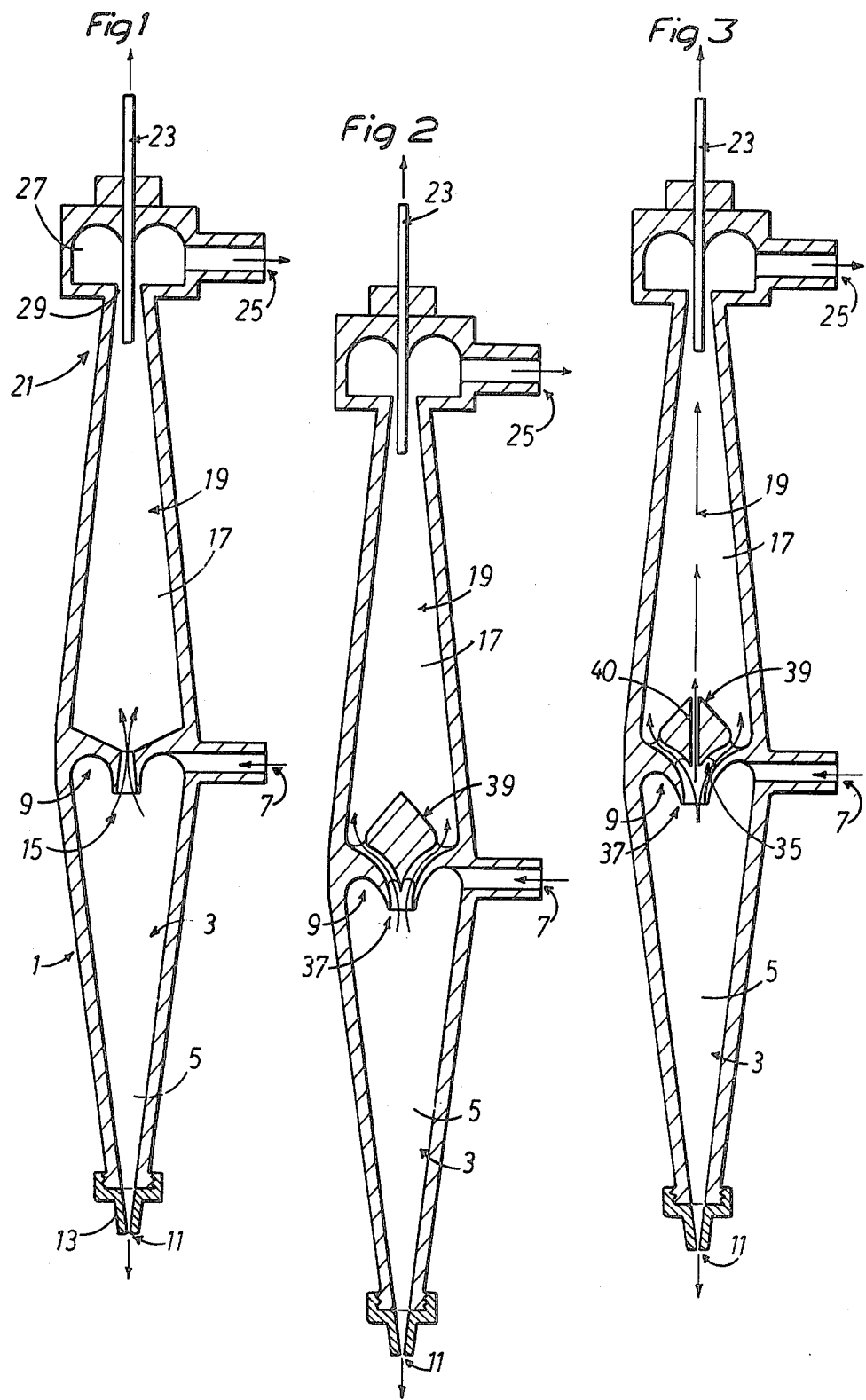

CYCLONE SEPARATORS

DESCRIPTION

The present invention concerns improvements in and relating to cyclone separation and more particularly relates to a method of cyclone separation of particulate matter contained in a fluid, from the fluid. It also concerns a cyclone separator for effecting the method.

For the purpose of the present specification, the word "particles" is intended to cover not only solid particles, but also droplets of a liquid, gas bubbles and combinations of solid, liquid and gas particles. In this way, it is possible to separate entrained impurities from a fluid, such impurities as ink and rubber or other adhesions sometimes known as "stickies", as well as air and fibres.

The particles may be referred to as being "dense" or "light". "Dense" particles, also known as "heavy" particles are those which have a density greater than that of the fluid in which they are suspended, whilst "light" particles are those which have a density less than that of the fluid. Their size range will normally be limited by devices located upstream or ahead of the cyclone in the cleaning system and by the dimensions of the cyclone. The fluids for which the present invention has been developed are liquids used in paper making, namely pulp stocks containing solid particles, suspended in water. In describing the invention hereafter, reference will be made to such pulp stocks. Unless the water density has been altered by solids dissolved therein, the light particles in such stocks will normally have a density less than 1 g/cm$^3$ and the dense particles a density greater than 1 g/cm$^3$.

An object of the present invention is to provide a method and cyclone separator for efficaciously effecting separation of particulate matter from a fluid, and more specifically provides a method and cyclone separator for removing both heavy and light contamination.

Our co-pending U.S. Pat. application Ser. No. 346,176, now abandoned describes a Uniflow cyclone separator which is particularly suitable for the removal of light (or floating) contaminants. As described in that patent specification, contaminated fluid is introduced into the upper end of a conical separator and passes downwardly on a helically converging path toward a plurality of outlets located at an end of the separator remote from the inlet. Each fraction is extracted at a respective one of the outlets.

In another cyclone separator, having what may be termed a reverse vortex action, at least one of the outlets for a separated fraction is located in close proximity to the inlet and the incoming fluid being treated initially passes downwardly in a helical path and a fraction thereafter flowing upwardly, i.e. in a reverse direction within the original helix. A fraction may be extracted from the bottom of the separator through a radial, circumferential or tangential outlet.

Neither of these two known separators alone can separate both heavy and light particles from a contaminated fluid.

According to the present invention then, a method of separating a fluid containing particulate matter into a plurality of fractions comprises feeding the contaminated fluid into one end of a reverse vortex cyclone separator, extracting a first (heavy) fraction from an end of the cyclone separator remote from the inlet, extracting partially cleaned fluid from an outlet disposed at said inlet end and feeding it, by way of a transition passage into a Uniflow cyclone separator at an inlet end thereof and extracting further fractions from an end of the Uniflow separator remote from the inlet end by way of respective outlets, at least one of the fractions being extracted axially from the Uniflow separator.

Preferably, the fraction extracted from the reverse vortex separator at said end is extracted axially.

Preferably the separator is aligned on a vertical axis with the Uniflow separator uppermost.

Also, according to the present invention, a cyclone separator for converting a fluid intake into several fractions of different densities comprises, in combination in a single unit, a first (reverse vortex) cyclone separator for removing heavy contaminants and a second (Uniflow) cyclone separator for removing light contaminants, the first separator comprising a chamber having a fluid inlet at one end thereof, and at an opposite end thereof a first outlet for passage of separated heavy contamination therethrough, a second outlet at said one end for passage therethrough of partially cleaned material, which outlet leads into one end of a chamber of the second separator, the opposite end of said second separator chamber having a plurality of outlets for extraction of several desired fractions, at least one of the outlets being arranged to extend axially from the separator.

Combining the two separators into a single unit with passage of partly cleaned material through a transition passage from one section to another economises on construction materials, piping, space and pumping energy.

In the preferred embodiment the first and second separators are vertically orientated, with the first separator disposed beneath the second separator. The first and second separators may both have conical chambers which converge from a common dividing wall serving as the end wall for each of the respective separator chambers. The fluid inlet is adjacent this common dividing wall. The cone angles of the chambers can be different. Conveniently, the respective chambers are on a common axis but this is not essential. The transitional passage between the first separator chamber and second separator chamber may comprise a straight bore coaxial with the axis of at least the first separator.

The upper chamber may be the same diameter as the transitional passage.

In an alternative embodiment, the transitional passage may comprise a coaxially disposed opening in the first separating chamber and one or more circumferentially spaced passages radiating therefrom and emerging in the second separating chamber as one or more circumferentially spaced openings so as to inject the fluid preferably tangentially into the second chamber. The passage is preferably spiral. A conical core stabilizer may be disposed concentrically within these openings. The outlet at said end of the first separator, remote from the inlet, is preferably axial.

In a further embodiment, substantially similar to the embodiments previously described, a passage passes through the axis of the conical core stabilizer between the first and second separating chambers. The passage allows contamination which has migrated to the axis of the first separating chamber to pass directly into the second separating chamber and thence to the rejects outlet of the second chamber.

In an alternative embodiment the reverse cyclone separator may be positioned uppermost, i.e., with the heavy outlet at the top, so as to prevent blockage of the outlet on shutting off. The cyclone separator may be disposed at any convenient angle of orientation, but vertical is preferred. The chamber of either separator may be cylindrical.

The present invention will now be described further, by way of example only, with reference to the accompanying drawings, in which:

FIG. 1 is a cross-section through a first embodiment of a separator in accordance with the invention, FIG. 2 is a cross-section through a second embodiment of a separator in accordance with the invention, and FIG. 3 is a cross-section through a further embodiment of a separator in accordance with the invention.

Referring firstly to FIG. 1, the cyclone separator has a housing generally indicated as 1 which defines first and second cyclone separators 3,19. The first cyclone separator 3 operates with a reverse vortex cyclone action. The chamber 5 of the first separator is generally conical and in the illustrated embodiment has a vertically orientated axis. A fluid inlet 7 opens, preferably tangentially, into one end of the chamber 5, at the widest end, and fluid entering is directed onto a circular path by a scroll 9 forming an end wall of the chamber 5. An outlet 11 is disposed at the opposite end of the chamber 5. This outlet is coaxial with the axis of the chamber 5. A conical elastic tip 13 is provided at the outlet 11 and has an apex hole or holes dimensioned according to the application. The inner surface of the conical chamber 5 may be smooth or have helical grooving or raised protuberances to assist separation. The tip assembly may be provided with cleaning means for automatic cleaning, for example with high pressure fluid.

A further outlet or transit passage 15 is provided at the end of the chamber 5 adjacent the inlet 7. The opening is coaxially disposed and leads into an end of a chamber 17 of the second cyclone separator 19. The second separator has a uni-direction flow action. The chamber is conical and converges from the inlet end to an outlet end 21 at which a plurality of outlet passages are disposed. Two outlets are shown in the illustrated embodiment. One outlet 23 is disposed on the axis, whilst a second outlet 25 is disposed radially and opens into an annular chamber 27 which communicates with the chamber 17 by way of an annular opening 29 surrounding a tubular passageway of the opening 23 which projects into the chamber 17. The walls of the chamber 17 may be smooth, or helically grooved or provided with raised protuberances to aid separation.

In operation, the contaminated fluid enters the inlet 7, usually under the influence of a pump, and is directed onto the end wall of the chamber formed by the scroll 9. This creates a circular helical path within the chamber 5 and the fluid initially moves downwardly toward the apex outlet 11. Heavy contamination migrates to the walls of the chamber 5 and is ejected through the conical elastic tip 13. Material from which heavy contamination has been removed passes upwardly, i.e., in the reverse flow direction, with axial and spin velocity to the outlet 15 and into the chamber 17 of the Uniflow separator 19, where the light contamination is removed. The light contamination migrates toward the central axis of the chamber 17 and passes out of the axially disposed outlet 23. The cleaned fluid passes out of the outlet 25 by way of the annular orifice 29 and chamber 27. Thus, heavy contamination is separated in the first cyclone separator and light contamination in the second cyclone separator. The principle on which the Uniflow cyclone separator operates is described in more detail in our co-pending U.S. patent application Ser. No. 346,176 now abandoned.

Several fractions can be separated in the Uniflow separator by providing additional annular chambers which intercept different stream lines.

Referring now to FIGS. 2 and 3, there is shown alternative embodiments. The same reference numerals used in the description of FIG. 1 have been used to denote the same parts. The difference resides in the arrangement of the transitional passage 15. Whereas in FIG. 1 it is shown as a straight axially aligned bore, in these embodiments the passage has a plurality of passageways 35 which radiate from a centrally disposed opening 37 in the chamber 5 of the first separator 3. These passageways 35 emerge into the chamber 17 of the second separator 19. A plurality of circumferentially spaced openings are thus formed. Disposed coaxially within these plurality of openings is a core stabilizer 39 which is conical in shape. The passageways 35 are preferably arranged to emerge tangentially, so that the fluid passing therethrough is directed on a helical path. More preferably, the passageways follow a spiral path to ensure that the fluid entering the second separator has the necessary spin velocity to give the desired separation.

In an alternative embodiment, not illustrated, one spiral passageway 35 is provided which leads from the first separating chamber to the second separating chamber. Thus, one or more passageways may be provided according to different embodiments of the invention.

The separator shown in FIG. 3 has first and second separating chambers 3,19 with a common wall therebetween. The wall comprises a conical core stabilizer 39 and has both circumferentially spaced openings 35 and an axial passage 40. The axial passage 40 communicates directly between the first and second separating chambers and allows contamination which has migrated to the axis of the first separating chamber 3 to pass directly into the second separating chamber 19, and thence to the rejects outlet 23 of the second chamber. In other respects the embodiment of FIG. 3 corresponds in operation to the embodiment of FIG. 2.

The cone angle of the respective cyclone separators may be different from one another and they need not necessarily be located on a common axis. It is not essential that the Uniflow separator be conical; it may be cylindrical with a diameter corresponding to that of the transition passage 15, in fact the chamber of the reverse vortex flow separator may also be cylindrical. The housing of the two separators may be connected together in the region of the common separating wall accommodating the transition passage 15.

Whilst the invention has been described with respect to embodiments which are vertically orientated with the Uniflow separator uppermost, this is not essential and any convenient angle of orientation can be employed. In order to prevent blockage of the heavy outlet which can occur with the illustrated embodiment on shutting off, it is envisaged that the orientation be reversed, so that the Uniflow separator is lowermost.

I claim:

1. A method of separating a fluid containing particulate matter into a plurality of fractions comprising feeding the contaminated fluid into one end of a reverse vortex cyclone separator at an inlet, extracting a first heavy fraction from an end of the reverse vortex cyclone separator remote from the inlet, extracting partially cleaned fluid from an outlet of the reverse vortex cyclone separator disposed at said inlet end, and feeding said partially cleaned fluid by way of a transition passage into a uni-direction cyclone separator at an inlet end thereof adjacent said inlet end of said reverse vortex cyclone separator and extracting further fractions from an end of the uni-direction cyclone separator remote from the inlet end of the uni-direction cyclone separator by way of respective outlets, at least one of the fractions being extracted axially from the uni-direction cyclone separator.

2. A method according to claim 1, wherein the fraction extracted from the reverse vortex separator at said end is extracted axially.

3. A method according to claim 1, wherein an axial passage is provided by means of which fluid is fed from the reverse vortex cyclone separator to the uni-direction cyclone separator.

4. A method according to claim 1, wherein a plurality of circumferentially spaced passages are provided by means of which the fluid is fed from the reverse vortex cyclone separator to the uni-direction cyclone separator.

5. A method according to claim 1, wherein part of the fluid is fed from the reverse vortex cyclone separator to the uni-direction cyclone separator by way of a plurality of circumferentially spaced passages and another part passes by way of an axial passage.

6. A cyclone separator for converting a fluid intake into several fractions of different densities comprising in combination in a single unit, a first cyclone separator for removing heavy contaminants, a second cyclone separator for removing light contaminants, and a transition passage connecting said first and second separators; the first separator being a reverse vortex separator having a separating chamber, a fluid inlet at one end of the chamber, a first outlet for passage of separated heavy contamination therethrough at an opposite end of the chamber, and a second outlet at said one end of the chamber for passage therethrough of partially cleaned material to said transition passage; said second separator being a uni-direction separator having a separating chamber, an inlet at one end of the chamber communicating with said transition passage, and a plurality of outlets for extraction of several fractions at the opposite end of the chamber from the inlet, at least one of the outlets being arranged to extend axially from the separator.

7. A cyclone separator according to claim 6, wherein a common dividing wall serves as the end wall for each of the respective separator chambers and said transition passage extends through said dividing wall.

8. A cyclone separator according to claim 7, wherein the fluid inlet of said first separator is disposed adjacent the common dividing wall.

9. A cyclone separator according to claim 6, wherein the end wall of the first chamber adjacent the inlet is in the form of a scroll which directs the inlet fluid onto a helical path.

10. A cyclone separator according to claim 6, wherein the first separator chamber is conical and converges towards the first outlet end.

11. A cyclone separator according to claim 6, wherein the first and second separating chambers are conical and the second chamber converges towards the outlet end.

12. A cyclone separator according to claim 11, wherein the cone angles of the two separator chambers are different from one another.

13. A cyclone separator according to claim 6, wherein the first and second separators are orientated vertically, with the first separator disposed beneath the second separator.

14. A cyclone separator according to claim 6, wherein the first and second chambers are disposed on a common axis and the transition passage comprises a passage aligned with the chamber axis.

15. A cyclone separator according to claim 6, wherein the first and second chambers are disposed on a common axis and the transition passage comprises a plurality of circumferentially spaced passages extending outwardly from a co-axial inlet opening.

16. A cyclone separator according to claim 15, wherein an axial passage is provided in addition to the circumferential passages.

* * * * *